Dec. 27, 1949 W. H. MISSON 2,492,493
GENERATOR AND FLUID FLOW METER
Filed Sept. 18, 1944
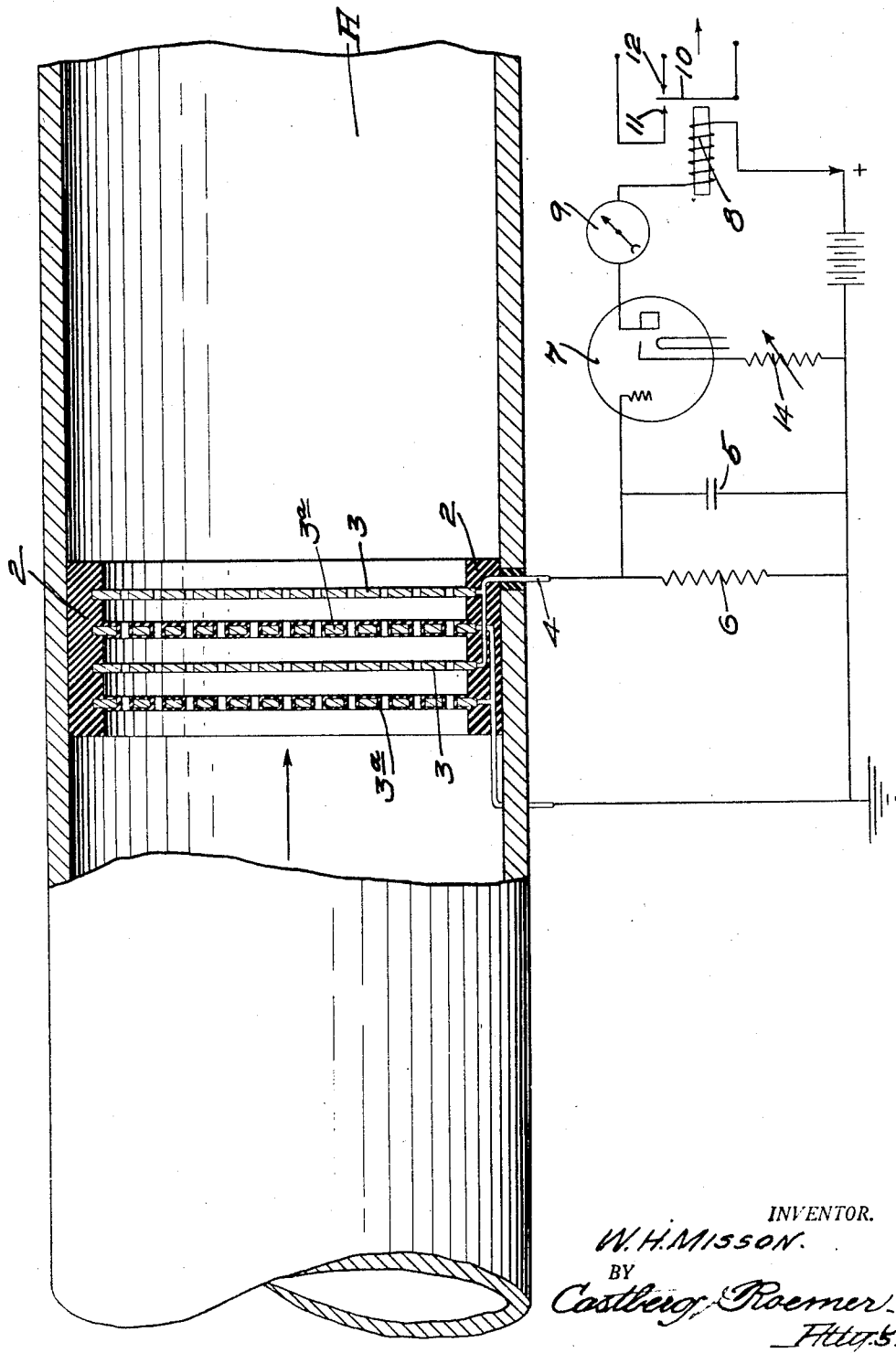
INVENTOR.
W. H. MISSON.
BY
Castberg Roemer
Attys.

Patented Dec. 27, 1949

2,492,493

UNITED STATES PATENT OFFICE 2,492,493

GENERATOR AND FLUID FLOW METER

William H. Misson, Los Altos, Calif., assignor of one-half to Frank V. Mayo, Stockton, Calif.

Application September 18, 1944, Serial No. 554,699

9 Claims. (Cl. 73—194)

This invention relates to an electric generator for use in conduits and especially to a generator which operates on the principle of contact potential developed by liquid flowing through the generator and the conduit.

In the oil industry it is common practice to pump or transport petroleum products from a refinery to a point of storage or delivery by means of a pipe line and to use the same pipe line for different products. For instance, high octane gasoline may be pumped through the line for several hours and then kerosene or a lower grade gasoline, and so on. In order to reduce mixing of different grades of products at the terminal of the flow, careful estimates are necessary of the rate of travel of the liquid accurately to time the arrival of a certain product. Since temperature changes, pressure variations, etc. introduce errors in such calculations there is necessarily considerable mixture of the products with consequent waste, hence, an accurate means of indicating when the flow of one product ceases and the next one starts would obviously reduce waste to a minimum.

The object of the present invention is to provide an electric generator which is adapted to be placed in a conduit of the character described; to provide a generator which operates on the principle of contact potential developed by liquid flowing through the generator and conduit; to provide a generator in which the potential developed varies with the rate of flow of a given material; to provide a generator in which the potential developed varies with the nature of the products; and further, to provide means actuated by the potential developed by the generator for indicating the rate of flow of a given product and for indicating when the flow of one product ceases and another starts.

The generator and an indicating apparatus actuated thereby is shown by way of illustrations in the accompanying drawing which is a diagrammatic view of the generator and an electric circuit actuated thereby.

Referring to the drawing in detail, A indicates a conduit through which oil refinery products of the character heretofore mentioned, or any other fluid, whether gas or liquid, is transferable. Disposed within the conduit is a frame 2 of suitable length which is constructed of a dielectric material and secured in said frame are a plurality of metal screens or perforated plates 3 and 3a. The screens are spaced apart as shown and are arranged in units of two or more. In the apparatus described the screens are arranged in pairs and screen 3a of each pair is coated with a dielectric material while the other screen 3 is bare or uncoated. All of the coated screens 3a are connected in parallel and are grounded to the conduit which forms a neutral point in the electrical system. The bare or uncoated screens 3 are similarly connected in parallel and by wire 4 with one terminal of a condenser 5, the other terminal of which is connected to a common ground. A resistance 6 of suitable magnitude is connected across the condenser and one terminal of the condenser is connected to the grid of a vacuum tube amplifier 7 whose output circuit contains a visual indicating meter 9 and a relay 8, the meter being an ordinary milliammeter, the dial of which displays such words as gasoline, kerosene, crude oil, etc. The armature 10 of the relay operates between contacts 11 and 12 which are disposed in a suitable circuit not shown so that predetermined increases or decreases in the plate current of the amplifier tube may be used to actuate an alarm or signal of any suitable character or to actuate apparatus whereby the flow may be controlled.

In actual operation a fluid flowing through the conduit will first contact one of the coated screens 3a and thereby develops a charge as it is pulled away from the screen by the force of the flowing liquid. A part of the charge so developed is given up or collected by the adjacent bare or uncoated screen 3 as the fluid contacts and flows therethrough. The same action takes place as the fluid flows through the next pair of screens and the cycle is repeated again and again depending upon the potential it is desired to develop.

As a charge develops on the bare or uncoated screens 3, a current is caused to flow through the resistance 6 to the ground and a potential difference will accordingly appear across the terminals of the condenser.

It has been found in practice that the potential developed is an accurate measure of the rate of flow of a fluid passing through a conduit as the potential increases directly as the rate of flow increases and decreases to zero when the flow is stopped. These variations in potential will of course be amplified in the vacuum tube 7 and by proper design of the equipment may be used to actuate the visual meter 9 or any other similar apparatus to either visually indicate or measure flow or both.

It has also been found that the magnitude of the potential developed across the condenser is a particular function of the product or nature of the fluid flowing through conduit. The apparatus can therefore be used to indicate when the flow of one fluid ceases and another starts. This can be indicated on the visual meter or the relay may be energized to engage a contact which will close a current through a signal or alarm circuit, etc. Where fluctuations in pressure are present two generators may be used in the conduit to differentiate between simultaneous and successive changes in potential at two points along the conduit. The value of such an arrangement should be obvious when the following is considered:

First, it must be remembered that the potential of each generator increases or decreases with change in pressure or velocity of the flowing fluid; and, secondly, that the potential changes with change in fluid, for instance, from gasoline to kerosene. If the indicator of one generator indicates change in velocity and the other indicator and generator indicates change in fluid, both indicators would change simultaneously in their reading if there is a change in pressure or velocity, due to the speed of the pressure wave set up in the conduit. On the other hand, if there is a change in fluid one indicator would change its reading first, shortly thereafter the other indicator would change its reading, as the speed of fluid flow is relatively negligible when compared to the speed of a pressure wave; hence, when the operator notes a simultaneous change in reading on both indicators he knows it is due to pressure or velocity change and that when the change in reading on the indicators is successive it is due to change in fluid.

A variable resistance 14 in the cathode circuit of the vacuum tube is provided as a means of adjusting the plate current to some predetermined value as required to calibrate the meter or adjust the alarm, etc.

One characteristic of the generator is that its internal impedance is very high, and as such is well suited for use with vacuum tube actuated circuits. Voltages sufficient to operate commercially available vacuum tubes are readily obtainable.

While only one generator and connected amplifier tube is illustrated, two or more may obviously be installed in the conduit; as previously stated, one to indicate and meter the flow of fluid and another to indicate or give a signal when the flow of one fluid ceases and another fluid starts.

Having thus described my invention, what I claim and desire to secure by Letters Patent is:

1. An apparatus for utilizing the flow of a fluid through a conduit to develop an electric current, comprising a metal plate disposed within the conduit, said plate being coated with a dielectric material and foraminated to permit fluid flow therethrough, an uncoated foraminated plate also disposed in the conduit and spaced from the coated plate, and means insulating one of the plates with relation to the conduit.

2. An apparatus for utilizing the flow of a fluid through a conduit to develop an electric current, comprising a frame composed of dielectric material disposed within the conduit, a metal plate secured within the frame, said plate being coated with a dielectric material and foraminated to permit fluid flow, and an uncoated foraminated plate secured in the frame and spaced from the coated plate.

3. An apparatus for utilizing the flow of fluid through conduit to develop an electric current, comprising a frame composed of dielectric material disposed within the conduit, a plurality of spaced metal plates disposed in pairs and secured cross-wise of the frame and conduit, said plates being foraminated to permit fluid flow, and a coating of dielectric material covering one plate of each pair.

4. An apparatus for utilizing the flow of a fluid through a conduit to develop an electric current, comprising a frame composed of dielectric material disposed within the conduit, a metal screen secured within the frame crosswise of the frame and conduit, said screen being coated with a dielectric material, and an uncoated metal screen secured in the frame parallel to and spaced from the first named screen.

5. An apparatus for utilizing the flow of a fluid through a conduit to develop an electric current, comprising a pair of metal plates disposed within the conduit crosswise thereof, said plates being spaced apart and being perforated to permit fluid flow, means insulating one plate with relation to the conduit, a conductor connected to said plate and extending through the conduit and insulated therefrom, a dielectric material coating the other plate, and a conductor connecting the coated plate with the conduit.

6. An apparatus for utilizing the flow of a fluid through a conduit to develop an electric current and for utilizing the current developed to actuate an indicator, comprising a pair of metal plates disposed within the conduit crosswise thereof, said plates being spaced apart and being perforated to permit fluid flow, means insulating one plate with relation to the conduit, a dielectric material coating the other plate, an electrically actuated indicator, a conductor connected with the uncoated plate and the indicator, and a second conductor connected with the coated plate and the indicator.

7. An apparatus for indicating a characteristic of a fluid flowing through a conduit comprising a foraminated metal plate extending across and grounded to the conduit, said plate being coated with a dielectric material, an uncoated foraminated plate extending across the conduit and spaced from the coated plate, and means responsive to the potential difference of the foraminated plates consequent upon the flow of fluid through said conduit for indicating a characteristic of said fluid.

8. An apparatus for indicating a characteristic of a fluid flowing through a conduit comprising a plate extending into and electrically connected to said conduit, said plate being coated with a dielectric material, an uncoated plate extending into said conduit and spaced from the coated plate, and means responsive to electrical difference of the plates consequent upon said flow of fluid for indicating a characteristic of said fluid.

9. An apparatus for indicating a characteristic of a fluid flowing through a conduit comprising a frame composed of dielectric material disposed within the conduit, a metal plate secured within the frame and grounded to the conduit, said plate being foraminated and coated with a dielectric material to permit fluid flow, an uncoated foraminated plate secured in the frame and spaced from the coated plate, said coated plate developing electric current on the principle of contact potential by fluid flowing therethrough, the uncoated plate collecting the potential developed, and means actuated by the potential developed for indicating a characteristic of the fluid flowing through the conduit.

WILLIAM H. MISSON.

REFERENCES CITED

The following references are of record in the file of this patent:

UNITED STATES PATENTS

| Number | Name | Date |
|---|---|---|
| 79,819 | Fleury | July 14, 1868 |
| 875,059 | Fry | Dec. 31, 1907 |
| 2,148,064 | Fagerberg | Feb. 21, 1939 |
| 2,315,805 | Mayo et al. | Apr. 6, 1943 |